US007733606B2

(12) United States Patent
Kato et al.

(10) Patent No.: US 7,733,606 B2
(45) Date of Patent: Jun. 8, 2010

(54) THIN FILM MAGNETIC HEAD WITH THERMAL FLYING HEIGHT CONTROL PADS LOCATED AT BOTH ENDS OF ALL PADS SERIES ON SLIDER SIDE PLANE

(75) Inventors: Atsushi Kato, Kanagawa (JP); Kiyonori Shiraki, Kanagawa (JP); Masanori Tanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 877 days.

(21) Appl. No.: 11/226,578

(22) Filed: Sep. 13, 2005

(65) Prior Publication Data
US 2006/0056110 A1 Mar. 16, 2006

(30) Foreign Application Priority Data
Sep. 13, 2004 (JP) ............................. 2004-265013

(51) Int. Cl.
*G11B 5/60* (2006.01)
(52) U.S. Cl. ................................... 360/234.3
(58) Field of Classification Search ............... 360/234.3
See application file for complete search history.

(56) References Cited

U.S. PATENT DOCUMENTS

| | | | | |
|---|---|---|---|---|
| 7,068,468 B2 * | 6/2006 | Kamijima | ................... | 360/128 |
| 7,095,587 B2 * | 8/2006 | Kurita et al. | ................. | 360/128 |
| 7,133,254 B2 * | 11/2006 | Hamann et al. | ........ | 360/125.74 |
| 7,187,521 B2 * | 3/2007 | Yamanaka et al. | .......... | 360/128 |
| 7,362,544 B2 * | 4/2008 | Shiramatsu et al. | ...... | 360/234.5 |
| 2003/0099054 A1 | 5/2003 | Kamijima | | |
| 2004/0165311 A1 * | 8/2004 | Yamanaka et al. | .......... | 360/128 |
| 2005/0024775 A1 * | 2/2005 | Kurita et al. | ............. | 360/234.3 |
| 2007/0103814 A1 * | 5/2007 | Yamanaka et al. | .......... | 360/128 |

FOREIGN PATENT DOCUMENTS

JP 05-20635 A 1/1993

\* cited by examiner

*Primary Examiner*—Mark Blouin
(74) *Attorney, Agent, or Firm*—Townsend and Townsend and Crew LLP; Rambod Nader (57) ABSTRACT

Embodiments of the invention prevent the write element lead wires from inducing crosstalk current in the read element lead wires. In one embodiment, a magnetic head slider comprises: a substrate portion; a heating resistor formed on the substrate portion through the intermediary of an insulation layer; a magnetic write element and a magnetic read element which are formed over the heating resistor through the intermediary of an insulation layer; and a terminal array structure provided with first terminals to wire the magnetic write element, second terminals to wire the magnetic read element, and third terminals to wire the heating resistor, wherein two of the third terminals for the heating resistor are located respectively on the opposite outer sides of the first and second terminals. In addition, an arm suspension is provided with a wiring structure in which wires connected to the terminals of the magnetic head slider, wires connected to the terminals, and wires connected to the terminals are guided to a predetermined direction and the magnetic write element lead wires are separated from the magnetic read element lead wires by the wires located in the central portion.

19 Claims, 10 Drawing Sheets

THIN FILM MAGNETIC HEAD WITH THERMAL FLYING HEIGHT CONTROL PADS LOCATED AT BOTH ENDS OF ALL PADS SERIES ON SLIDER SIDE PLANE

CROSS-REFERENCES TO RELATED APPLICATIONS

This application claims priority from Japanese Patent Application No. JP2004-265013, filed Sep. 13, 2004, the entire disclosure of which is incorporated herein by reference.

BACKGROUND OF THE INVENTION

The present invention relates to a magnetic head slider to realize high density recording in a magnetic disk drive. In particular, the invention relates to a thin film magnetic head slider capable of adjusting the distance between the magnetic disk and the magnetic head, a structure to support that magnetic head slider, a magnetic disk drive employing that magnetic head slider and so on.

A magnetic disk drive comprises a rotating magnetic disk and a thin film magnetic head slider (hereinafter referred to as a slider) which is supported and positioned in the radial direction by a load beam. Magnetic information is read/written from/onto the magnetic disk by a read/write element mounted on the slider which runs relatively over the magnetic disk. The slider is designed to fly as a gas-lubricated bearing due to the wedge film effect of air. Thus, the slider does not make solid contact with the magnetic disk. To raise the recording density in the magnetic disk drive, increase the storage capacity of the apparatus and reduce the size of the apparatus, it is effective to raise the linear recording density by reducing the distance between the slider and the magnetic disk, that is, the flying height of the slider.

Generally, the flying height margin is designed by allowing for manufacturing fluctuations, operating ambient pressure and temperature ranges and the like so that the slider does not make contact with the magnetic disk even under the worst condition. If the slider has the capability to adjust the flying height on an individual head basis according to the operating environment, the flying height margin can be removed, making it possible to remarkably reduce the flying height of the read/write element while preventing contact between the slider and the magnetic disk.

In this respect, a slider structure is proposed which adjusts the distance between the read/write element and the magnetic recording medium by a thin film heating resistor which is formed in proximity to the read/write element and heated as necessary. When heated, the resistor thermally expands and projects to adjust the distance between the read/write element and the recording medium. This technique is disclosed in, for example, Japanese Patent Laid-Open No. 5-20635 (page 3 and FIG. 1) (Patent Document 1).

BRIEF SUMMARY OF THE INVENTION

In a magnetic disk drive employing this kind of thin film magnetic head, crosstalk current flows during write operation in the lead wires for read due to the high frequency current and flyback voltage appearing in and across the lead wires for write. Whereas the sense current applied to the read head is typically 2 to 3 mA, the crosstalk current becomes equal to or larger than the sense current if the write lead wires are close to the read lead wires. Since the larger the sense current is set, the read sensitivity rises, the sense current is set as large as possible if allowed by the life requirement. However, the crosstalk current inevitably lowers the highest sense current which can be set. Typically, the write lead wires are made apart from the read lead wires so as to reduce the crosstalk current and therefore allow a higher sense current.

Providing a slider with a heating resistor as described in the aforementioned Patent Document 1 increases the number of terminals due to those for wiring the heating resistor. To make desirable the distance between the write lead wires and the read lead wires, it is important that the arrangement of the heating resistor terminals is well considered. In the aforementioned Patent Document 1, structural consideration is not made regarding the arrangement of the heating resistor terminals and write and read element terminals and their lead wires.

It is a feature of the present invention to provide a magnetic head slider whose terminal and wiring layout for the heating resistor is improved so as to reduce the influence of the crosstalk current.

A magnetic head slider according to one aspect of the present invention comprises: a substrate portion; a heating resistor formed on the substrate portion through the intermediary of an insulation layer; a magnetic write element and a magnetic read element which are formed over the heating resistor through the intermediary of an insulation layer; and a terminal array structure provided with first terminals to wire the magnetic write element, second terminals to wire the magnetic read element and third terminals to wire the heating resistor, wherein two of the third terminals for the heating resistor are located respectively on the both sides of the first and second terminals.

In an embodiment, the heating resistor is located between an underlayer insulation film formed on the substrate portion and an under shield formed on the underlayer insulation film.

Preferably, the material of the heating resistor and the material of the lead lines are selected so that the heating resistor has a larger resistance than the lead lines.

A head slider support structure according to another aspect of the present invention comprises: a substrate portion, a heating resistor formed on the substrate portion through the intermediary of an insulation layer, a magnetic write element and a magnetic read element which are formed over the heating resistor through the intermediary of an insulation layer, and a terminal array structure provided with first terminals to wire the magnetic write element, second terminals to wire the magnetic read element and third terminals to wire the heating resistor, wherein two of the third terminals for the heating resistor are located respectively on the outer sides of the first and second terminals; and an arm suspension provided with a wiring structure in which first wires connected to the first terminals of the magnetic head slider, second wires connected to the second terminals, and third wires connected to the third terminals are guided to a predetermined direction and the first wires are separated from the second wires by the third wires located in the central portion.

The scope of the present invention also includes a magnetic disk drive where the aforementioned head slider is used to write and read data to and from a rotating magnetic disk. Further, the scope of the present invention includes a wafer having a device structure for the aforementioned thin film magnetic head slider.

According to the present invention, it is possible to separate the lead wires of the magnetic write element terminals from the lead wires of the magnetic read element terminals by the lead wires of the heating resistor terminals since the heating resistor terminals are respectively located on an outer side or, preferably, on the opposite outer sides of the magnetic write element terminals and magnetic read element terminals. This makes it possible to prevent the write element lead wires from inducing crosstalk current in the read lead wires during write operation.

DETAILED DESCRIPTION OF THE INVENTION

With reference to the drawings, the following will describe how slider embodiments of the present invention and magnetic disk drive using the same are configured.

Embodiment 1

Figure 1:
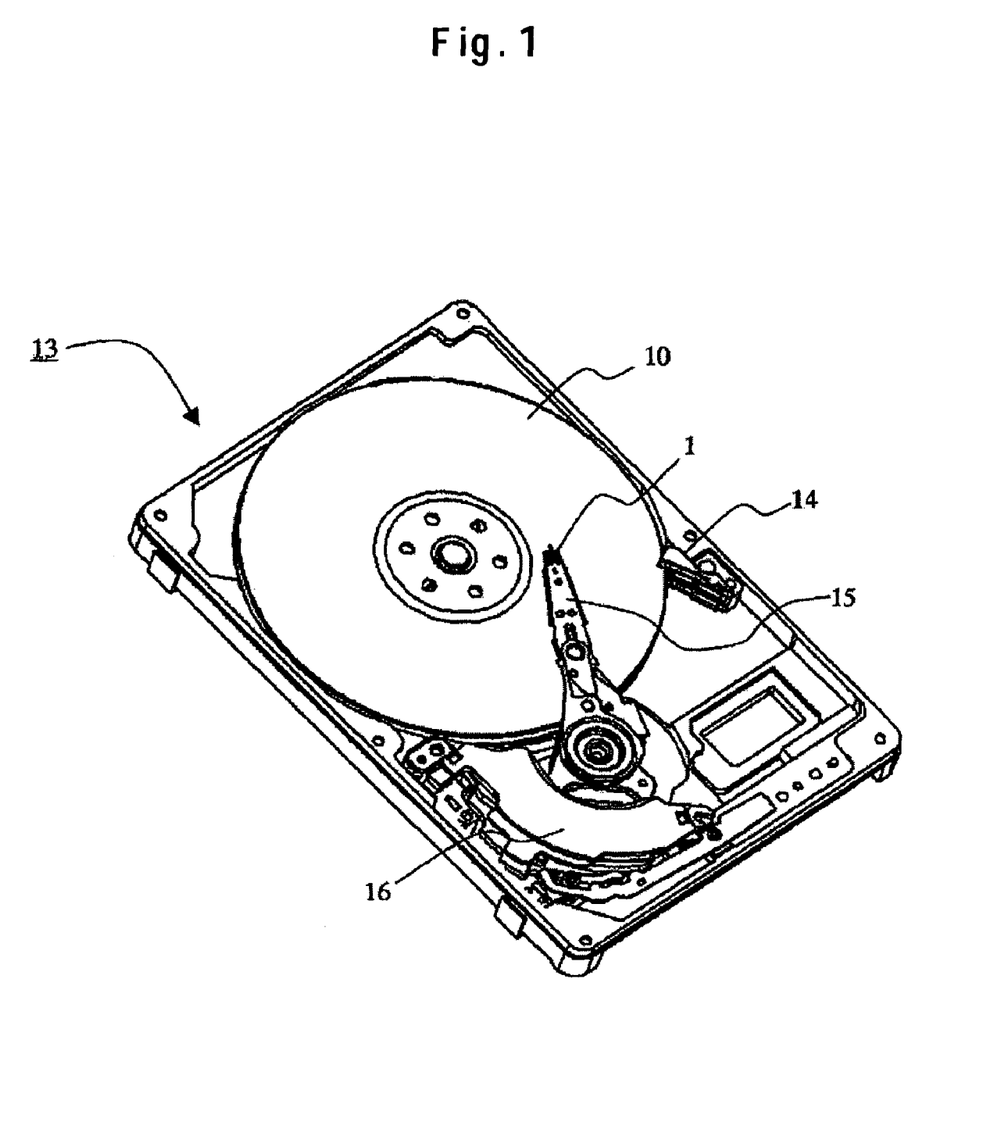
FIG. 1 is a perspective view of a magnetic disk drive where a slider is installed, according to one embodiment.

FIG. 1 schematically shows the configuration of a magnetic disk drive where a slider embodiment is installed. A magnetic disk drive comprises: a magnetic disk 10 which has magnetic information stored thereon and is rotated by a spindle motor; and a slider 1 which is carried and positioned in the radial direction by a load beam 15. Magnetic information is read and written on the magnetic disk while the slider 1 is moving relative to the magnetic disk 10. The slider 1, as a gas-lubricated bearing, is designed to be lifted by the wedge film effect of air so that it does not make direct solid contact with the magnetic disk. To raise the linear recording density, the flying height of the slider is kept within, say, 10 nm.

The slider 1 is attached to a plate spring-like load beam 15. The load beam gives a load which urges the slider 1 toward the magnetic disk surface. Carried by the load beam 15 which is driven by a voice coil motor 16, the slider 1 performs seek operations in the radial direction of the magnetic disk 10 to carry out read and write on the whole magnetic disk surface. If the apparatus is stopped or does not receive any read/write instruction for a certain period of time, the slider 1 is unloaded off of the magnetic disk 10 back onto a ramp 14.

Note that although the above-mentioned magnetic disk drive is provided with a load-unload mechanism, this slider 1 is also applicable to a contact start-stop magnetic disk drive where the slider 1 stands by in a specific area of the magnetic disk while the apparatus is at standstill.

Figure 2:
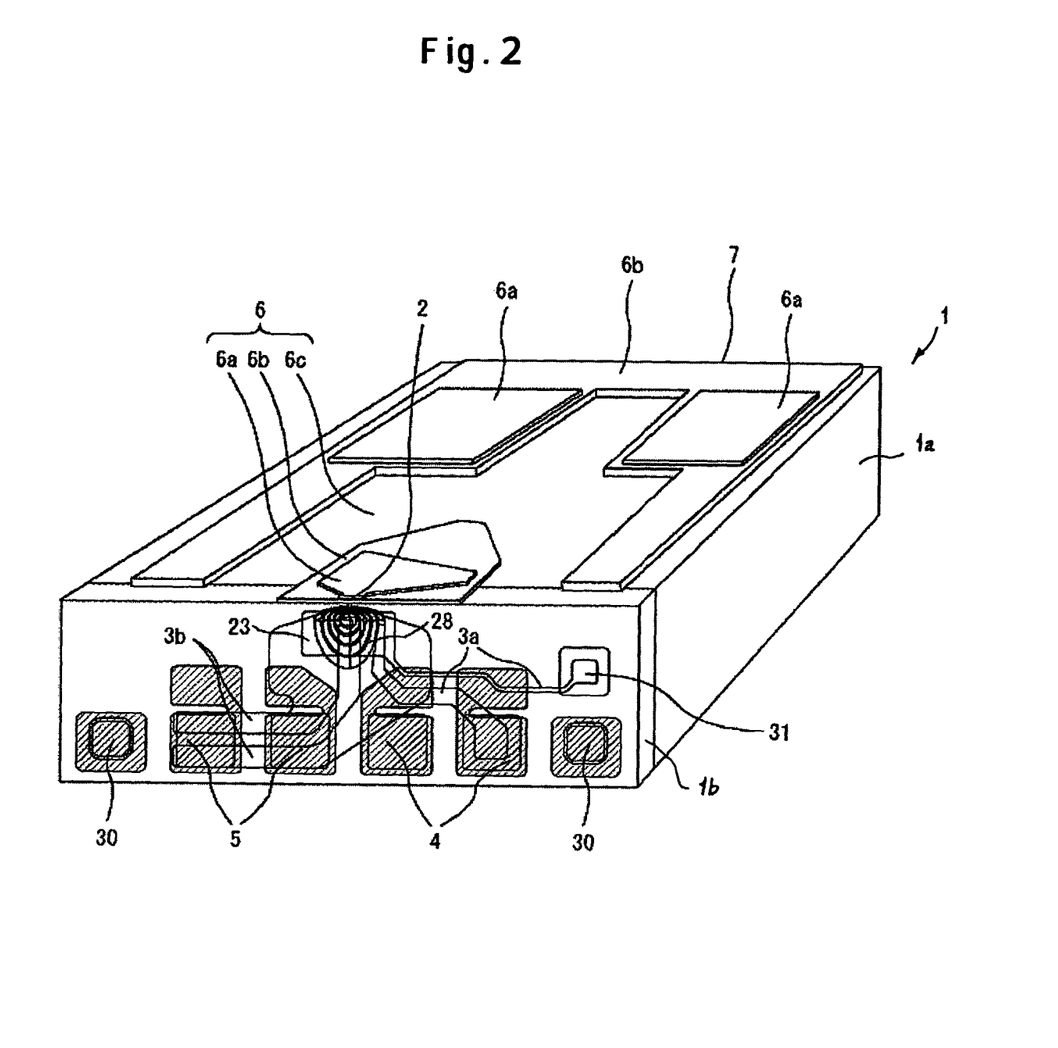
FIG. 2 is a perspective view of the slider, according to one embodiment.
Figure 3:
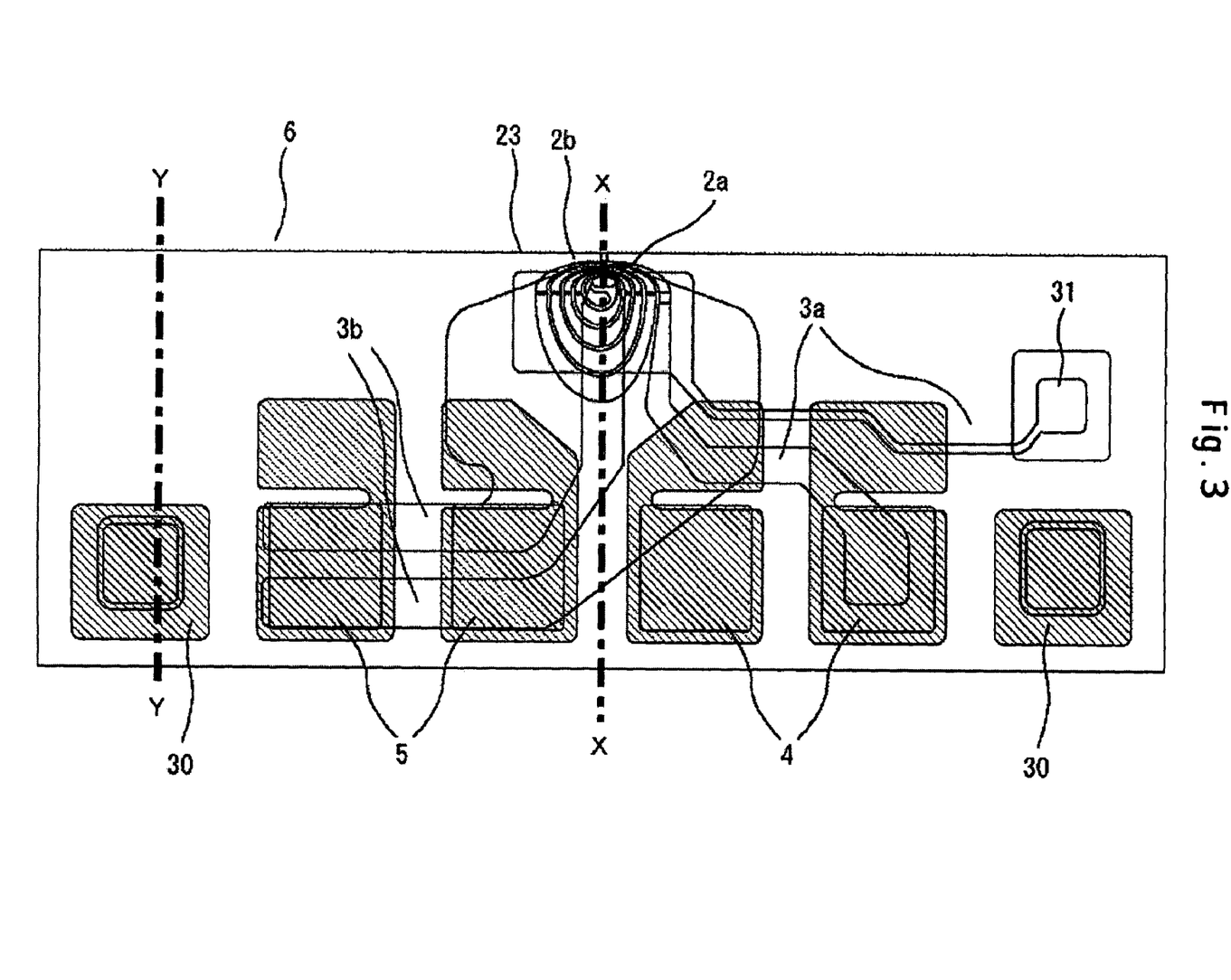
FIG. 3 is a view as viewed from the air outflow side of the slider, according to one embodiment.
Figure 4:
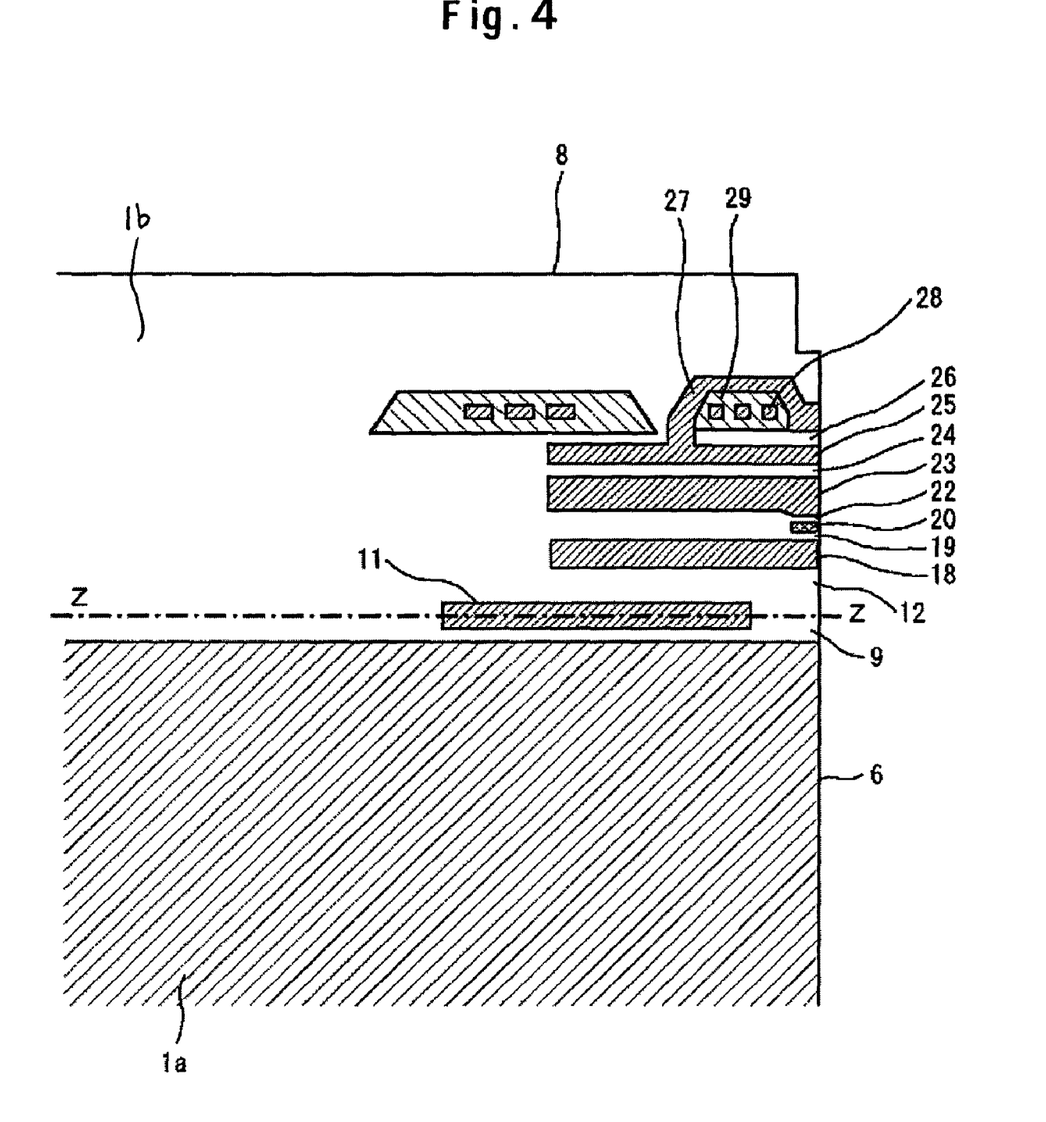
FIG. 4 is an enlarged sectional view of the slider (taken along X-X of FIG. 3), according to one embodiment.
Figure 5:
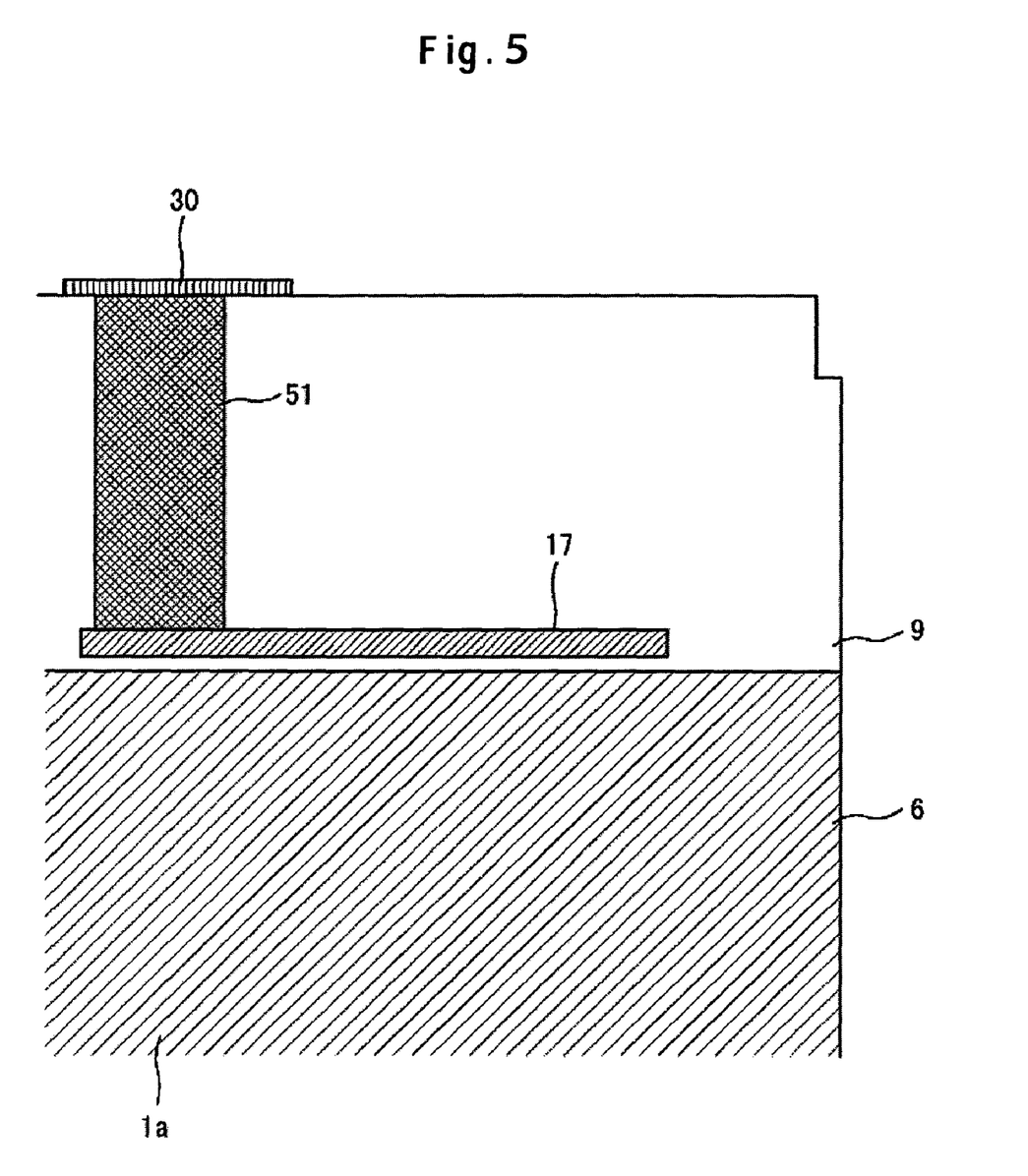
FIG. 5 is an enlarged sectional view of the slider (taken along Y-Y of FIG. 3), according to one embodiment.
Figure 6:
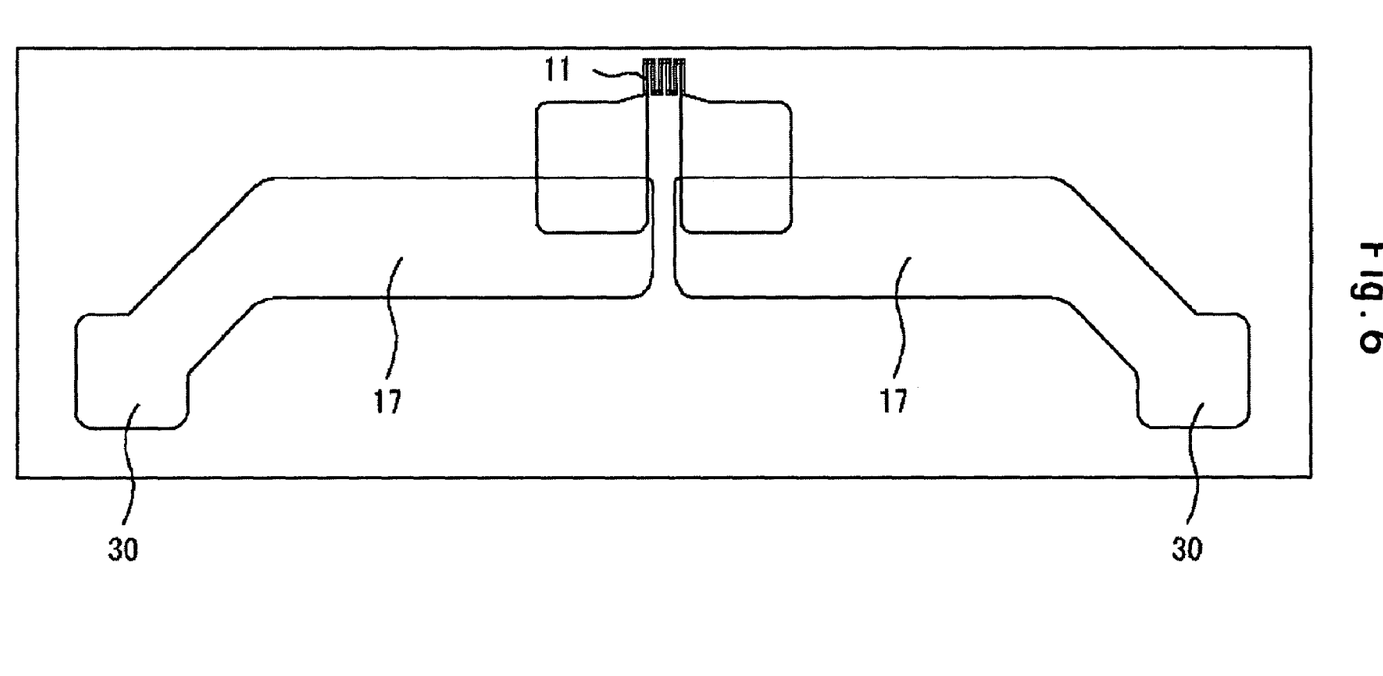
FIG. 6 is a sectional view taken along Z-Z of FIG. 4.

Referring to FIG. 2 and subsequent drawings, the following describes in detail how the slider embodiment is configured. FIG. 2 is a perspective view of the slider. In FIG. 3, the slider is viewed from its air outflow side. FIG. 4 shows a sectional view taken along X-X of FIG. 3. It provides an enlarged sectional view of a thin-film head portion 1b comprising a magnetic write element 2a and a magnetic read element 2b. FIG. 5 shows a sectional view taken along Y-Y of FIG. 3. FIG. 6 shows a sectional view taken along Z-Z of FIG. 4. It shows the configuration of a heating resistor.

Firstly, the laminated structure of the slider 1 is described with reference to the sectional view of FIG. 4. In the manufacture process, an underlayer insulation film 9 is formed on a substrate 1a. Then, a heating resistor 11 made of permalloy is formed on the underlayer insulation film 9 and an insulation layer 12 made of alumina or the like is formed thereon to insulate the heating element 11. Further, an internal metal film 17 and a stud 51 (FIG. 5) are formed as an electrical pathway from the heating resistor 11. The heating element 11 will be described later in detail.

Then, on the insulation layer 12, an under shield film 18 and an under gap film 19 made of alumina or the like are formed. Further, a magnetoresistive element (hereinafter referred to as "MR element") 20, which is a magnetic read element, and a pair of electrodes (not shown in FIG. 4) to bring out a magnetic signal from the MR element 20 are formed. Then, an upper gap film 22 made of alumina or the like and an upper shield film 23 are formed. Further, an upper shield insulation film 24 made of alumina or the like is formed. Then, after a lower magnetic pole 25 of a magnetic write element is formed on the upper shield insulation film 24, an internal metal film as lead line which extends between the lower magnetic pole 25 and one end of the internal metal film 17 is formed in order to provide conductive connection between the heating resistor and the lower magnetic pole 25. Then, a magnetic gap film 26 made of alumina or the like and an upper magnetic pole 27 of the magnetic write element are formed. Then, a coil 28 to cause the upper magnetic pole 27 to generate a magnetic field and an organic insulation film 29 are formed.

Further, read lead lines 3b are extended from an electrode connected to the MR element 20 and write lead lines 3a are extended from the coil 28. Then, a hard overcoat made of alumina or the like is formed so as to cover, protect and insulate all of the aforementioned elements. Finally, write relay terminals 4 to apply current to the coil 27 from external and read relay terminals 5 to carry the magnetic signal to external are formed.

In addition, heating resistor relay terminals 30 to apply current to the heating resistor 11 from external are formed on the pair of internal metal films 17 which are extended from the heating resistor 11 connected electrically with the lower magnetic pole 25 via the internal metal film (refer to FIG. 6). The heating resistor relay terminals 30 are made of a material which shows a higher normal electrode voltage in a solution to be used in subsequent process stages of polishing and cleaning the flying surface than a constituent material of the lower and upper magnetic poles 25 and 27, for example Co.Ni.Fe alloy. Thus, the material (for example, metal element, alloy or compound) is selected from a group of such metals as Au, Ag, Pt, Ru, Rh, Pd, Os, Ir or a group of such conductive ceramics as $Al_2O_3$.TiC, SiC, TiC, WC, and $B_4C$.

The area of each heating resistor relay terminal 30 is designed to be larger than the cross section of either the lower magnetic pole 25 or the upper magnetic pole 27 of the magnetic write element along the flying surface. The heating resistor 11 is formed by using thin film process. As an example of the thin film resistor, a thin meandering NiCr wire of 0.15 μm in thickness and 4.5 μm in width is formed in a 60 μm-deep and 60 μm-wide area filled with alumina. Its resistance is about 500Ω.

Referring to FIG. 2 and FIG. 3, the slider 1 comprises: a substrate (wafer) portion 1a made of such a material as sintered alumina-titanium carbide (hereinafter abbreviated as AlTiC); and a thin film magnetic head portion 1b. The thin film magnetic head portion 1b comprises: a magnetic write element 2a and a magnetic read element 2b which are formed by thin film process on the substrate portion 1a; internal metal films 3 as lead lines which are formed in conductive contact with the magnetic write element 2a and the magnetic read element 2b; write relay terminals 4 to electrically connect the magnetic write element 2a to external; read relay terminals 5 to electrically connect the magnetic read element 2b to external; a heating resistor 11 to adjust the flying height of the read/write element by heating a part of the slider and thereby forcing the part to thermally expand and project; internal metal films 17 as lead lines which are formed in conductive contact with the heating resistor 11; heating resistor relay terminals 30 to electrically connect the heating resistor 11 to external; and a relay terminal 31 for preventing discharge.

The slider 1 is a substantially rectangular solid measuring, for example, 1.25 mm in length, 1.0 mm in width and 0.3 mm in thickness (picoslider). It has a total of six faces: a flying surface 6; an air inflow end surface 7; an air outflow end surface 8; both side surfaces; and a back surface. In order to lower the mass and thereby improve the positioning accuracy as well as lowering the cost, the slider 1 may be reduced in size to, for example, 0.85 mm in length, 0.7 mm in width and 0.23 mm (femtoslider). The flying surface 6 has subtle steps (step bearing) formed thereon by such process as ion milling or etching. It generates air pressure toward the magnetic disk and serves as an air bearing to bear the load applied to the back surface.

The flying surface 6 has three kinds of surfaces which are substantially parallel but different in height. They are rail surfaces 6a which are nearest to the magnetic disk, shallow recesses 6b which are step air bearing surfaces recessed about 100 nm to 200 nm from the rail surfaces and a deep recess 6c which is recessed about 1 μm from the rail surfaces. When an air flow caused by the rotating magnetic disk advances from a step bearing shallow recess 6b to a rail surface 6a, positive air pressure occurs since air is compressed by the narrowing flow path. On the other hand, when the air flow advances from a rail surface 6a or shallow recess 6b to the deep recess 6c, negative air pressure occurs due to the widening flow path. Note that FIG. 2 exaggerates the recesses in depth.

The slider 1 is designed to fly in such an attitude that the flying height is larger at the air inflow end 7 side than at the air outflow end 8 side. Thus, the flying surface near the outflow end comes closest to the disk. Since the rail surface 6a near the outflow end projects from the shallow recess 6b and deep recess 6c, the rail surface 6a comes closest to the disk unless the pitch or roll attitude of the slider exceeds a certain limit. The magnetic read/write element 2 is formed in an area of the rail surface 6a belonging to the thin film head portion 1b. The shape of the flying surface 6 is designed so that an appropriate distance of about 10 nm is kept between the magnetic read/write element 2 and the disk as a result of the load given by the load beam balancing well with the positive pressure and negative pressure occurring on the flying surface 6.

Although the above description is made on the assumption that the slider has a two-step bearing flying surface consisting of three kinds of substantially parallel surfaces 6a, 6b and 6c, the same effect can also be obtained by applying the present invention to a slider which have a step bearing flying surface consisting of four or more kinds of parallel surfaces.

FIG. 6 depicts the heating resistor 11 viewed from the outflow end side (sectional view along Z-Z of FIG. 4). The two wiring lines 17 from the heating resistor 11 are respectively connected to the terminals 30.

In this embodiment, the arrangement of the terminals for the heating resistor 11 and the wiring structure for the terminals are significant as described below. Two terminals 30 for the heating resistor 11, two terminals 4 for the magnetic write element and two terminals for the magnetic read element (see FIG. 7), that is, a total of six terminals are bonded to the wiring pads on the suspension gimbal. Six lead wires are divided into two separate groups of three wires each and the two groups are laid respectively on the two gimbal arms. Beyond the arms, they are assembled again into a single group of six wires before reaching the root of the suspension. In this wiring system, the innermost lead wires from the slider are guided to the outermost positions on the suspension whereas the outermost lead wires from the slider are guided to the innermost positions on the suspension.

Figure 7:
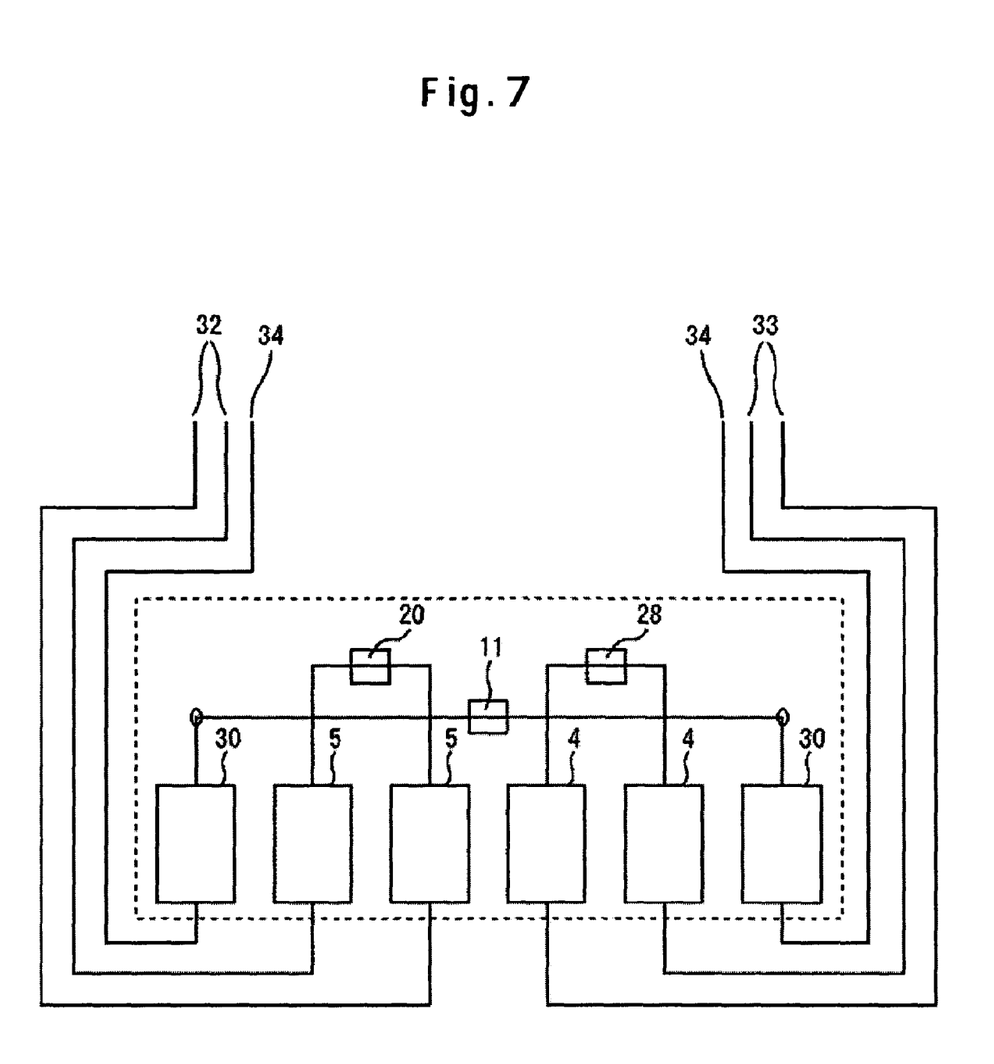
FIG. 7 shows the terminal and wiring layout of the slider, according to one embodiment.

With reference to FIG. 7, the arrangement of the terminals and the wiring structure are described. In this embodiment, the two terminals 30 for the heating resistor 11 are respectively located on the outer sides of the write relay terminals 4 and read relay terminals 5, that is, located so as to sandwich the terminals 4 and 5. The wires 34 for the heating resistor 11 are located between the wires 33 for the write head and the wires 32 for the read head. That is, the write head wires 33 are separated from the read head wires 32 by the heating resistor 11 wires 34, making it possible to locate the wires 32 apart from the wires 33. This can prevent the write head wires 33 during write operation from inducing crosstalk current in the read head wires 32. This terminal arrangement and wiring structure can also be applied to a perpendicular head structure.

Figure 8:
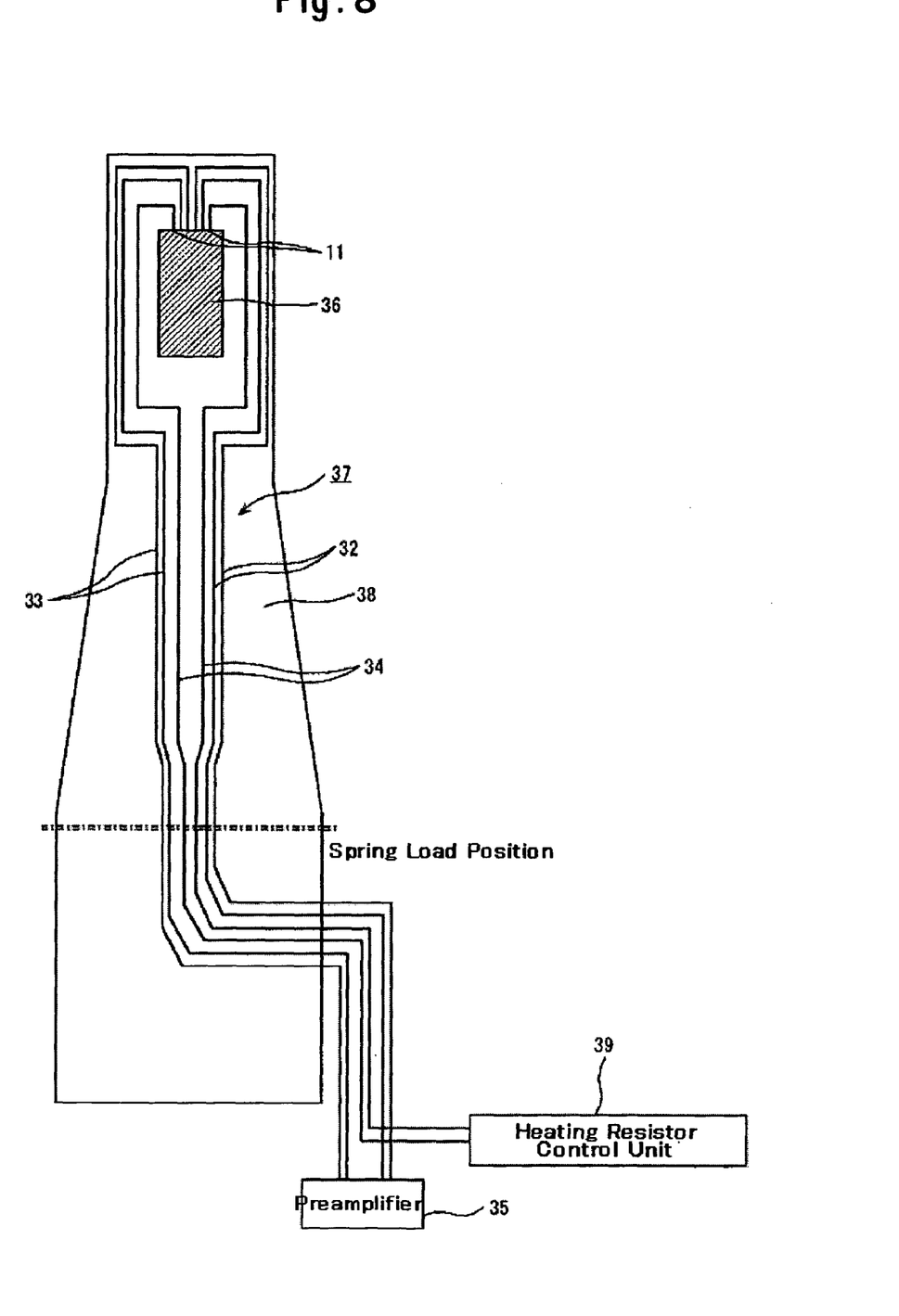
FIG. 8 is a top view of the embodiment, schematically showing how the transmission lines are laid on the arm suspension, according to one embodiment.

FIG. 8 shows the wiring structure applied to an arm suspension 38 used in the magnetic disk drive. In FIG. 8, wiring lines 37 which extend from the magnetic head 36 to a preamplifier 35 and heating resistor control unit 39 are printed on the arm suspension 38. The ends of these printed wiring lines 37 are respectively connected to the terminals of the magnetic read element, magnetic write element and heating resistor 11. These wiring lines 37 consist of a total of six wires; two wires 32 for the magnetic write element, two wires 33 for the magnetic read element, and two wires 34 for the heating resistor 11. The former four wires are for connection between the preamplifier 35 and the magnetic head 36. The latter two wires are for connection between the heating resistor 11 and the heating resistor control unit 39.

As apparent from the depicted wiring structure, the heating resistor 11 wires 34 separates the magnetic read element wires 32 from the magnetic write element wires 33, resulting in some distance imposed between the wires 32 and the wires 33.

Embodiment 2

Figure 9:
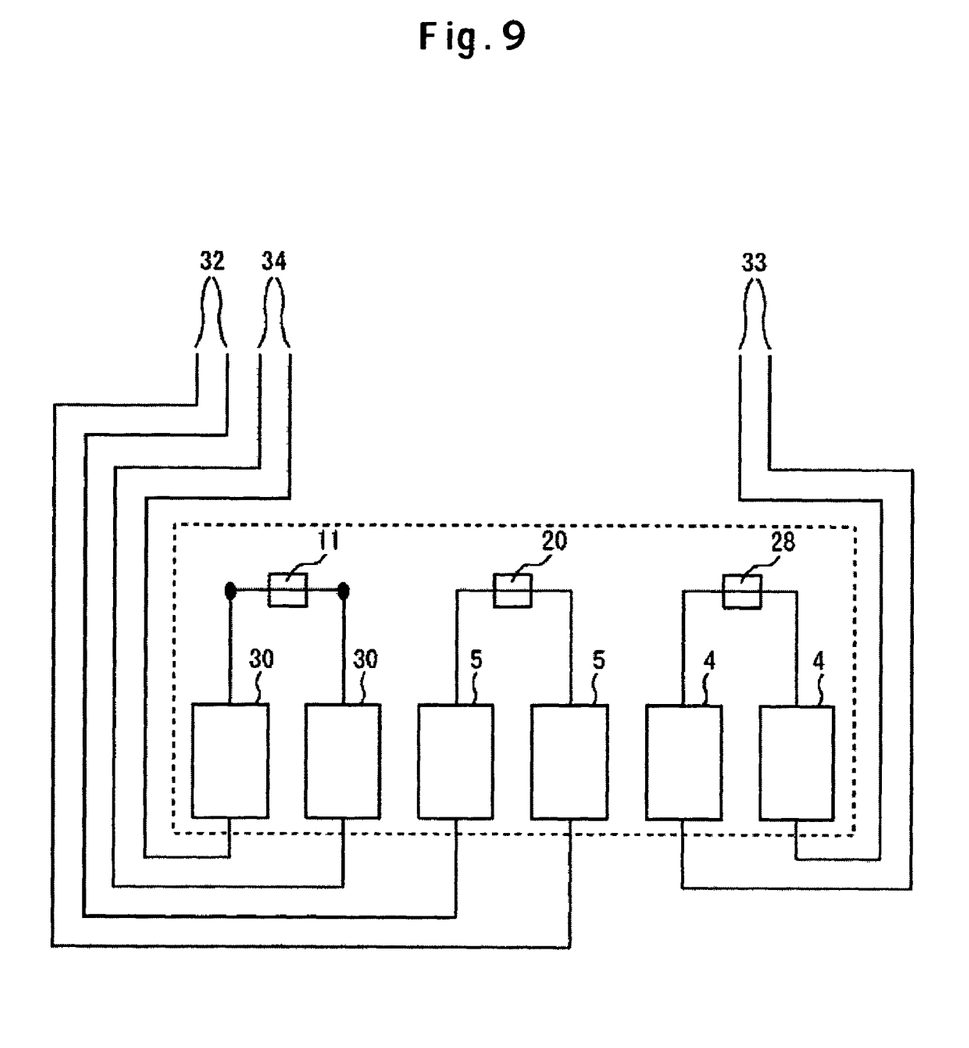
FIG. 9 shows another example of the terminal and wiring layout.

FIG. 9 shows another example of the terminal and wiring layout. In this example, the terminals 4 for the magnetic write element, the terminals 5 for the magnetic read element and the terminals 30 for the heating resistor 11 are arranged in this order. That is, the heating resistor 11 terminals 30 are located on the outer side of the magnetic read element terminals 5. In this case, although the magnetic write element wires 33 are separated from the magnetic read element wires 32 by the heating resistor 1 wires 34, vibration characteristics of the suspension may be adversely influenced since the magnetic write element wires 33 and magnetic read element wires 32 causes asymmetry. However, since the wires 32 are separated from the wires 33 by the heating resistor 11 wires 34, it is possible to prevent the write head wires from inducing crosstalk current in the read wires during write operation.

Figure 10:
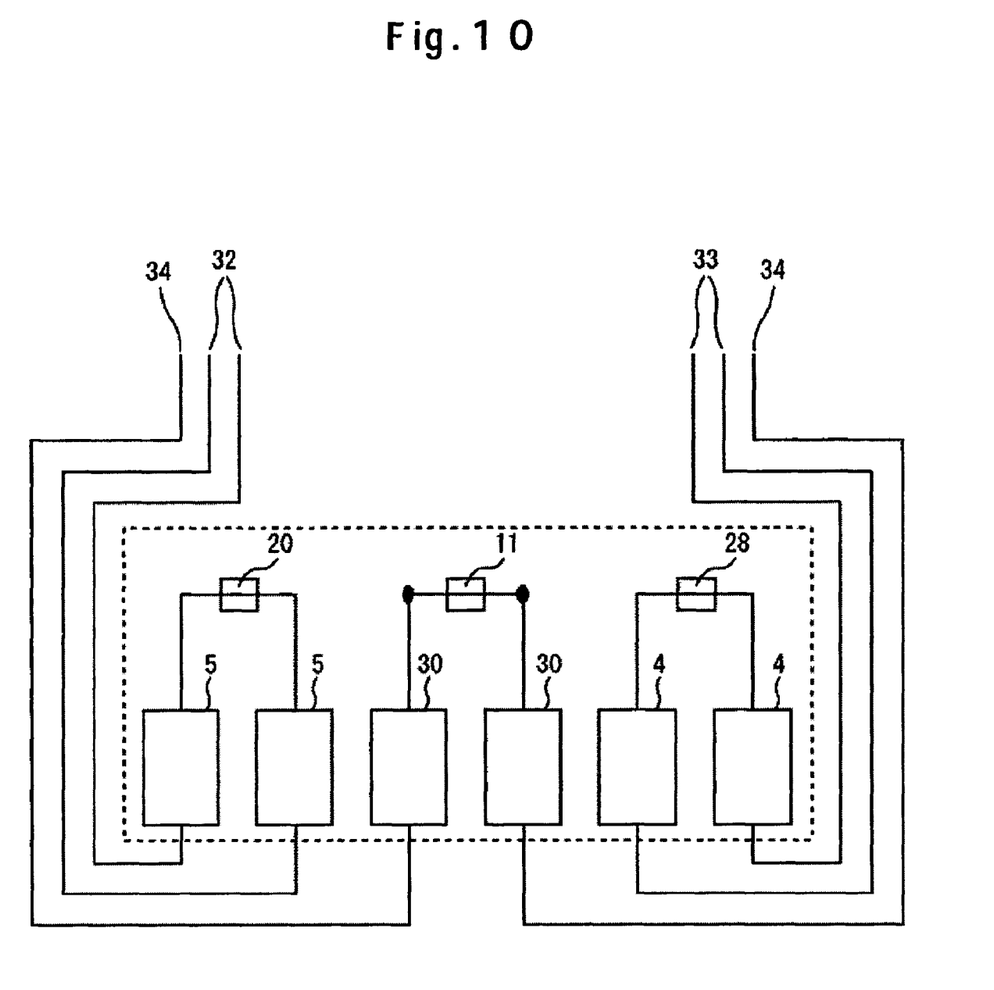
FIG. 10 shows another example of the terminal and wiring layout provided for comparison.

In FIG. 10, yet another terminal and wiring layout example is shown for comparison. In this example, the heating resistor relay terminals 30 are located between the write relay terminals 4 and the read relay terminals 5. In this case, the wires 34 connected to the heating resistor relay terminals 30 become the outermost ones, making the magnetic read element wires 33 close to the magnetic write element wires 32. This is disadvantageous in respect of the crosstalk current induced in the read wires by the write head wires during write operation.

Considering the examples shown in FIG. 9 and FIG. 10 for comparison, it is apparently preferable that the terminals 11 for the heating resistor 30 be located respectively on the outer sides of the write and read terminals 4 and 5 as in FIG. 2, FIG. 3 and FIG. 7. Note that the terminal and wiring layout of FIG. 9 can also prevent the crosstalk if its adverse influence on vibration characteristics of the suspension can be ignored.

Embodiment 3

In the aforementioned first embodiment, since the terminals 30 of the heating resistor 11 are located respectively on the outer sides of the other terminals 4 and 5, the lead lines 17 (the wires 34 in FIG. 7) are relatively longer as apparent from FIG. 7. That is, if the material of the lead lines 17 is not so lower in resistivity than the material of the heating resistor 11, the lead lines 17 cause a large heating loss. Thus, in order to heat the heating resistor 11 as effectively as possible, the material of the heating resistor 11 is selected from the highest resistivity ones whereas the material of the lead lines 17 is selected from the lowest resistivity ones.

Specifically, the heating resistor 11 is made of NiCr or the like whereas the lead lines 17 are made of NiFe, Cu or the like. As a result, the resistance of the heating resistor 11 is at least twice the resistance of the lead lines 17. Thus, it is possible to effectively heat the heating resistor 11, the object to be heated, since the undesired heating loss by the lead lines 17 is suppressed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider comprising:
    a substrate portion;
    a heating resistor formed of metal alloy on the substrate portion through the intermediary of an insulation layer;
    a magnetic write element and a magnetic read element which are formed over the heating resistor through the intermediary of an insulation layer; and
    a terminal array structure limited to a side proximal to the magnetic write element and opposite to the substrate portion with first terminals to wire the magnetic write element, second terminals to wire the magnetic read element, and third terminals to wire the heating resistor, wherein two of the third terminals for the heating resistor are located respectively on the opposite outer sides of the first and second terminals.

2. A magnetic head slider according to claim 1, wherein the heating resistor is located between an underlayer insulation film formed on the substrate portion and an under shield formed on the underlayer insulation film.

3. A magnetic head slider according to claim 2, wherein the material of the heating resistor and the material of the lead lines are selected so that the heating resistor has a larger resistance than the lead lines.

4. A wafer having a device structure for a thin film magnetic head slider according to claim 3.

5. A magnetic head slider according to claim 3 wherein the heating resistor is made of NiCr or permalloy.

6. A wafer having a device structure for a thin film magnetic head slider according to claim 2.

7. A magnetic head slider according to claim 2 wherein the heating resistor is made of NiCr or permalloy.

8. A wafer having a device structure for a thin film magnetic head slider according to claim 1.

9. A magnetic head slider according to claim 1 wherein the heating resistor is made of NiCr or permalloy.

10. A magnetic head slider according to claim 1, wherein the material of the heating resistor and the material of the lead lines are selected so that the heating resistor has a larger resistance than the lead lines.

11. A magnetic disk drive comprising a magnetic head slider according to claim 1 used to write and read data to and from a rotating magnetic disk.

12. A magnetic head support structure comprising:
    a magnetic head slider having a substrate portion, a heating resistor formed of metal alloy on the substrate portion through the intermediary of an insulation layer, a magnetic write element and a magnetic read element which are formed over the heating resistor through the intermediary of an insulation layer, and a terminal array structure limited to a side proximal to the magnetic write element and opposite to the substrate portion with first terminals to wire the magnetic write element, second terminals to wire the magnetic read element and third terminals to wire the heating resistor, wherein the third terminals for the heating resistor are located respectively on the outer sides of the first and second terminals; and
    an arm suspension provided with a wiring structure in which first wires connected to the first terminals of the magnetic head slider, second wires connected to the second terminals, and third wires connected to the third terminals are guided to a predetermined direction and the first wires are separated from the second wires by the third wires located in a central portion.

13. A magnetic disk drive where a magnetic head slider according to claim 12 is used to write and read data to and from a rotating magnetic disk.

14. A wafer having a device structure for a thin film magnetic head slider according to claim 12.

15. A magnetic head slider according to claim 12 wherein the heating resistor is made of NiCr or permalloy.

16. A magnetic head support structure comprising:
    a magnetic head slider having a substrate portion, a heating resistor formed of metal alloy on the substrate portion through the intermediary of an insulation layer, a magnetic write element and a magnetic read element which are formed over the heating resistor through the intermediary of an insulation layer, and a terminal array structure limited to a side proximal to the magnetic write element and opposite to the substrate portion with first terminals to wire the magnetic write element, second terminals to wire the magnetic read element, and third terminals to wire the heating resistor, wherein two of the third terminals for the heating resistor are located respectively on the opposite outer sides of the first and second terminals; and an arm suspension provided with a wiring structure in which first wires connected to the first terminals of the magnetic head slider, second wires connected to the second terminals, and third wires connected to the third terminals are guided to a determined direction and the first wires are separated from the second wires by the third wires located in a central portion.

17. A magnetic disk drive comprising a magnetic head slider according to claim 16 used to write and read data to and from a rotating magnetic disk.

18. A wafer having a device structure for a thin film magnetic head slider according to claim 16.

19. A magnetic head slider according to claim 16 wherein the heating resistor is made of NiCr or permalloy.

* * * * *